US008572494B2

(12) United States Patent
Kuehner et al.

(10) Patent No.: US 8,572,494 B2
(45) Date of Patent: Oct. 29, 2013

(54) FRAMEWORK FOR DEVELOPMENT AND CUSTOMIZATION OF WEB SERVICES DEPLOYMENT DESCRIPTORS

(75) Inventors: Rupam Sinha Kuehner, Toronto (CA); Jeffrey Yu Kwan Liu, Toronto (CA); Allan S. L. Zhang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2590 days.

(21) Appl. No.: 10/890,690

(22) Filed: Jul. 14, 2004

(65) Prior Publication Data
US 2006/0015816 A1    Jan. 19, 2006

(51) Int. Cl.
*G06F 3/00* (2006.01)
*G06F 9/44* (2006.01)
*G06F 15/173* (2006.01)

(52) U.S. Cl.
USPC .......................... 715/744; 717/109; 709/223

(58) Field of Classification Search
USPC .......................... 715/744; 717/109; 709/223
See application file for complete search history.

(56) References Cited

U.S. PATENT DOCUMENTS

| | | | | |
|---|---|---|---|---|
| 7,451,224 | B1 * | 11/2008 | Stamler | 709/228 |
| 2002/0054170 | A1 * | 5/2002 | Rush et al. | 345/854 |
| 2002/0104071 | A1 * | 8/2002 | Charisius et al. | 717/109 |
| 2002/0108099 | A1 | 8/2002 | Paclat | 717/102 |
| 2002/0194357 | A1 * | 12/2002 | Harris et al. | 709/232 |
| 2003/0060896 | A9 * | 3/2003 | Hulai et al. | 700/1 |
| 2003/0140029 | A1 * | 7/2003 | Messinger | 707/1 |
| 2003/0236923 | A1 * | 12/2003 | Jeyaraman et al. | 709/318 |
| 2004/0019809 | A1 * | 1/2004 | Sheinis et al. | 713/202 |
| 2004/0028212 | A1 * | 2/2004 | Lok et al. | 379/265.09 |
| 2004/0158585 | A1 * | 8/2004 | Kovacs et al. | 707/104.1 |
| 2004/0172407 | A1 * | 9/2004 | Arpirez Vega | 707/103 R |
| 2004/0220882 | A1 * | 11/2004 | Suto et al. | 705/64 |
| 2004/0230559 | A1 * | 11/2004 | Newman et al. | 707/1 |
| 2005/0038816 | A1 * | 2/2005 | Easton | 707/104.1 |
| 2005/0044197 | A1 * | 2/2005 | Lai | 709/223 |
| 2006/0053087 | A1 * | 3/2006 | Pavlov | 707/1 |
| 2006/0184915 | A1 * | 8/2006 | DeGroote et al. | 717/106 |

OTHER PUBLICATIONS

Pierce et al., "Interoperable Web Services for Computational Portals", Community Grid Labs, Indiana University, Bloomington, IN, 2002 IEEE, pp. 1-12.

(Continued)

*Primary Examiner* — Boris Pesin
*Assistant Examiner* — Matthew Ell
(74) *Attorney, Agent, or Firm* — Steven M. Greenberg, Esq.; Carey, Rodriguez, Greenberg & O'Keefe

(57) ABSTRACT

An extensible software framework is used for the development and customization of XML based Web service deployment descriptors. The framework may provide for the mapping and synchronization of XML data fragments in the XML files to user interface components, resulting in an interface that can be used for the development and customization of the Web service configuration. This mechanism may allow concurrent read and write accesses to the XML based Web service deployment descriptors. The mechanism may be extensible, providing for the mapping between the user interface and the XML data fragments to be customized. Additional extensibility may come from the ability of the framework to readily accommodate the situation where the complete configuration of the Web service is described in multiple XML files. The resulting editor may present one unified display of all of the information across multiple files.

19 Claims, 16 Drawing Sheets

(56) References Cited

OTHER PUBLICATIONS

Gergic et al., "An Approach to Lightweight Deployment of Web Services", Voice Systems and Technologies, IBM Czech Republic, SEKE '02, pp. 635-640.

Polivy et al.,"Authenticating Distributed Data Using Web Services and XML Signatures", Microsoft Corporation, Redmond, WA, 2002, pp. 80-89.

Suryanarayana et al., "Profiles for the Situated Web", SBC Technology Resources, Austin, TX, 2002, pp. 200-209.

McLaren et al., "Developing Generative Frameworks Using XML, Searchspace Limited", San Diego, CA, Nov. 26-29, 2001, http://csdl.computer.org/comp/proceedings/ase/2001/1426/00/14260368abs.htm, pp. 368.

* cited by examiner

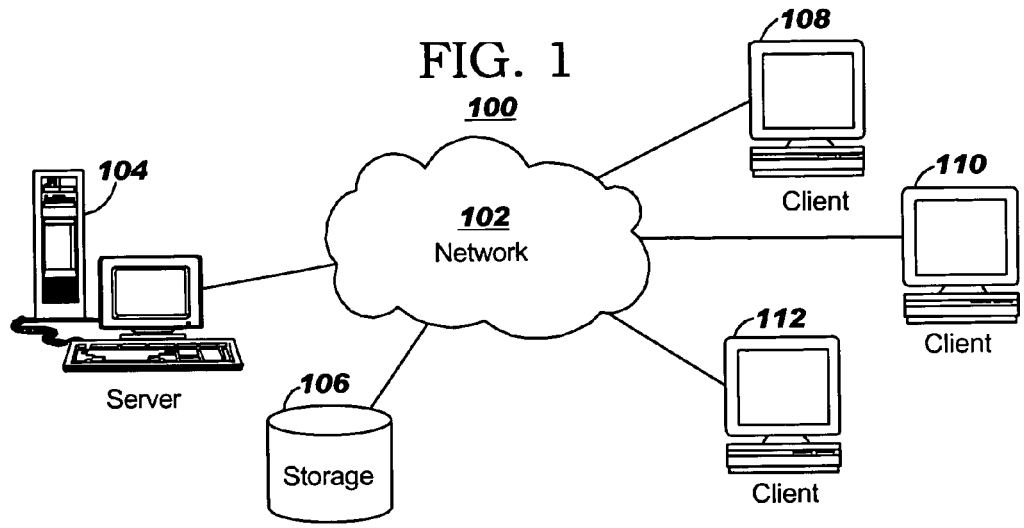
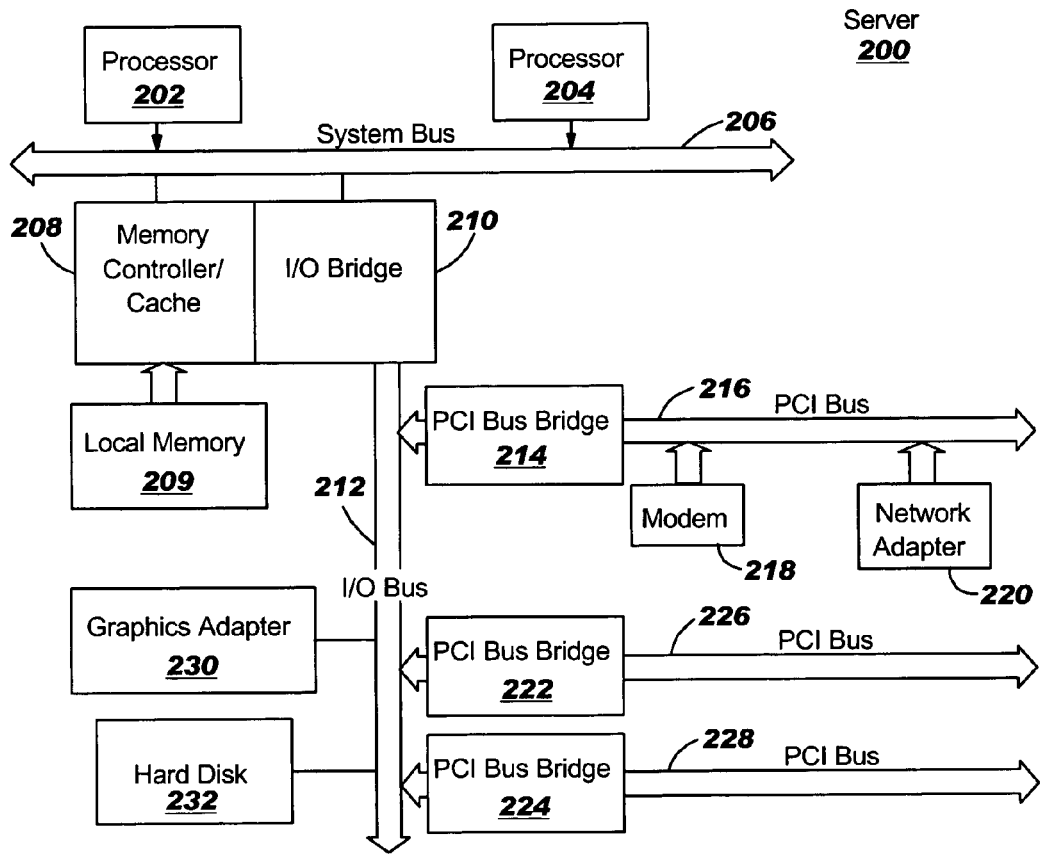

FIG. 7A

700 webservices.xml

```xml
<?xml version="1.0" encoding="UTF-8"?>
<!DOCTYPE webservices PUBLIC "-//IBM Corporation, Inc.//DTD J2EE Web services 1.0//EN" "http://www.ibm.com/webservices/dtd/j2ee_web_services_1_0.dtd">

<webservices id="WebServices_1055733893456">
    <webservice-description id="WebServiceDescription_1055733991818">
      <description>Stock Quote Service</description>
      <display-name>Stock Quote Service</display-name>
      <small-icon>/images/stock_quote.gif</small-icon>
      <large-icon>/images/stock_quote.gif</large-icon>
      <webservice-description-name>StockQuoteService</webservice-description-name>
      <wsdl-file>WEB-INF/wsdl/StockQuote.wsdl</wsdl-file>
      <jaxrpc-mapping-file>WEB-INF/StockQuote_mapping.xml</jaxrpc-mapping-file>
      <port-component id="PortComponent_1055733991818">
        <port-component-name>StockQuote</port-component-name>
        <wsdl-port id="WSDLPort_1055733991818">
          <namespaceURI>http://com</namespaceURI>
          <localpart>StockQuote</localpart>
        </wsdl-port>
        <service-endpoint-interface>com.StockQuote</service-endpoint-interface>
        <service-impl-bean id="ServiceImplBean_1055733991818">
          <servlet-link>com_StockQuote</servlet-link>
        </service-impl-bean>
        <handler id="Handler_1055734155343">
          <description>Stock Quote Generic Handler</description>
          <display-name>Stock Quote Generic Handler</display-name>

<handler-name>com.ibm.wsspi.webservices.rpc.handler.GenericHandler</handler-name>
  <handler-class>com.ibm.wsspi.webservices.rpc.handler.GenericHandler</handler-class>
          <init-param id="InitParam_1055734323595">
            <param-name>host</param-name>
            <param-value>localhost</param-value>
            <description>(No description)</description>
          </init-param>
          <init-param id="InitParam_1055734323596">
            <param-name>port</param-name>
            <param-value>80</param-value>
            <description>(No description)</description>
          </init-param>
          <soap-header id="SOAPHeader_1055734323595">
            <namespaceURI>http://com</namespaceURI>
            <localpart>StockQuote</localpart>
          </soap-header>
          <soap-role>StockQuote</soap-role>
        </handler>
      </port-component>
    </webservice-description>
  </webservices>
```

702 → `<description>Stock Quote Service</description>`
704 → `<display-name>Stock Quote Service</display-name>`

FIG. 8A

```
ibm-webservices-ext.xmi

<?xml version="1.0" encoding="UTF-8"?>
<com.ibm.etools.webservice.wsext:WsExtension xmi:version="2.0" xmlns:xmi="http://www.omg.org/XMI"
  xmlns:com.ibm.etools.webservice.wsext="http://www.ibm.com/websphere/appserver/schemas/5.0.2/
wsext.xmi" xmi:id="WsExtension_1055733990796">
 <wsDescExt xmi:id="WsDescExt_1055733990796" wsDescNameLink="StockQuoteService">
  <pcBinding xmi:id="PcBinding_1055733990796" pcNameLink="StockQuote">
   <serverServiceConfig xmi:id="ServerServiceConfig_1055734049721" actorURI="">
    <securityRequestReceiverServiceConfig xmi:id="SecurityRequestReceiverServiceConfig_1055734808682">
     <requiredIntegrity xmi:id="RequiredIntegrity_1055734808682">
802   <references xmi:id="Reference_1055734808682" part="securitytoken"/>
     </requiredIntegrity>
     <requiredConfidentiality xmi:id="RequiredConfidentiality_1055734808692">
      <confidentialParts xmi:id="ConfidentialPart_1055734808692" part="usernametoken"/>
     </requiredConfidentiality>
     <loginConfig xmi:id="LoginConfig_1055734808692">
      <authMethods xmi:id="AuthMethod_1055734808692" text="BasicAuth"/>
     </loginConfig>
     <idAssertion xmi:id="IDAssertion_1055734808692" idType="Username" trustMode="BasicAuth"/>
    </securityRequestReceiverServiceConfig>
    <securityResponseSenderServiceConfig xmi:id="SecurityResponseSenderServiceConfig_1055734808692">
     <integrity xmi:id="Integrity_1055734808692">
      <references xmi:id="Reference_1055734808692" part="securitytoken"/>
     </integrity>
     <confidentiality xmi:id="Confidentiality_1055734808692">
      <confidentialParts xmi:id="ConfidentialPart_1055734808693" part="usernametoken"/>
     </confidentiality>
    </securityResponseSenderServiceConfig>
   </serverServiceConfig>
  </pcBinding>
 </wsDescExt>
</com.ibm.etools.webservice.wsext:WsExtension>
```

FIG. 9A

```
ibm-webservices-bnd.xmi

<?xml version="1.0" encoding="UTF-8"?>
<com.ibm.etools.webservice.wsbnd:WSBinding xmi:version="2.0" xmlns:xmi="http://www.omg.org/XMI"
xmlns:com.ibm.etools.webservice.wsbnd="http://www.ibm.com/websphere/appserver/schemas/5.0.2/
wsbnd.xmi" xmi:id="WSBinding_1055733990766">
  <wsdescBindings xmi:id="WSDescBinding_1055733990766" wsDescNameLink="StockQuoteService">
    <pcBindings xmi:id="PCBinding_1055733990766" pcNameLink="StockQuote">
      <securityRequestReceiverBindingConfig
xmi:id="SecurityRequestReceiverBindingConfig_1055734049761">
        <trustedIDEvaluator xmi:id="TrustedIDEvaluator_1055734808732"
classname="com.ibm.wsspi.wssecurity.id.TrustedIDEvaluatorImpl"
name="">
          <properties xmi:id="Property_1055734808732" name="http://com" value="StockQuote"/>
        </trustedIDEvaluator>
        <signingInfos xmi:id="SigningInfo_1055734808732">
          <signatureMethod xmi:id="SignatureMethod_1055734808732"
algorithm="http://www.w3.org/2000/09/xmldsig#rsa-sha1"/>
          <certPathSettings xmi:id="CertPathSettings_1055734808732">
            <trustAnyCertificate xmi:id="TrustAnyCertificate_1055734808732"/>
          </certPathSettings>
          <canonicalizationMethod xmi:id="CanonicalizationMethod_1055734808732"
algorithm="http://www.w3.org/2001/10/xml-exc-c14n#"/>
          <digestMethod xmi:id="DigestMethod_1055734808732" algorithm="http://www.w3.org/2000/
09/xmldsig#sha1"/>
        </signingInfos>
        <encryptionInfos xmi:id="EncryptionInfo_1055734808732" name="">
          <encryptionKey xmi:id="EncryptionKey_1055734808732" name="" locatorRef="Stock Quote
Key Locator"/>
          <encryptionMethod xmi:id="DataEncryptionMethod_1055734808732"
algorithm="http://www.w3.org/2001/04/xmlenc#tripledes-cbc"/>
          <keyEncryptionMethod xmi:id="KeyEncryptionMethod_1055734808732"
algorithm="http://www.w3.org/2001/04/xmlenc#rsa-1_5"/>
        </encryptionInfos>
        <keyLocators xmi:id="KeyLocator_1055734808742" name="Stock Quote Key Locator"
classname="com.ibm.wsspi.wssecurity.config.KeyStoreKeyLocator">
          <properties xmi:id="Property_1055734808742" name="http://com" value="StockQuote"/>
        </keyLocators>
        <loginMappings xmi:id="LoginMapping_1055734808742" authMethod="BasicAuth"
configName="Stock Quote Login Mapping">
          <callbackHandlerFactory xmi:id="CallbackHandlerFactory_1055734808742"
classname="com.StockQuoteLoginMapping"/>
          <properties xmi:id="Property_1055734808743" name="http://com" value="StockQuote"/>
        </loginMappings>
      </securityRequestReceiverBindingConfig>
      <securityResponseSenderBindingConfig
xmi:id="SecurityResponseSenderBindingConfig_1055734049761">
        <signingInfo xmi:id="SigningInfo_1055734808742">
          <signatureMethod xmi:id="SignatureMethod_1055734808742"
algorithm="http://www.w3.org/2000/09/xmldsig#rsa-sha1"/>
          <signingKey xmi:id="SigningKey_1055734808742" name="" locatorRef="Stock Quote Key Locator"/>
          <canonicalizationMethod xmi:id="CanonicalizationMethod_1055734808742"
algorithm="http://www.w3.org/2001/10/xml-exc-c14n#"/>
          <digestMethod xmi:id="DigestMethod_1055734808742" algorithm="http://www.w3.org/2000/
09/xmldsig#sha1"/>
        </signingInfo>
```

FIG. 9B

```
    <encryptionInfo xmi:id="EncryptionInfo_1055734808742" name="">
<encryptionKey xmi:id="EncryptionKey_1055734808742" name="" locatorRef="Stock Quote Key
Locator"/>
        <encryptionMethod xmi:id="DataEncryptionMethod_1055734808742"
algorithm="http://www.w3.org/2001/04/xmlenc#tripledes-cbc"/>
        <keyEncryptionMethod xmi:id="KeyEncryptionMethod_1055734808742"
algorithm="http://www.w3.org/2001/04/xmlenc#rsa-1_5"/>
    </encryptionInfo>
    <keyLocators xmi:id="KeyLocator_1055734808743" name="Stock Quote Key Locator"
classname="com.ibm.wsspi.wssecurity.config.KeyStoreKeyLocator">
        <properties xmi:id="Property_1055734808744" name="http://com" value="StockQuote"/>
        <keyStore xmi:id="KeyStore_1055734808742"
storepass="{xor}DCswPDR/DiowKzp/DCswLTovPiws"
path="/StockQuote" type="Basic"/>
        <keys xmi:id="Key_1055734808752" alias="(Key alias)" keypass="{xor}dxQ6Ji8+LCx2"
name="(Key name)"/>
    </keyLocators>
    </securityResponseSenderBindingConfig>
   </pcBindings>
   <parameters xmi:id="Parameter_1055734808752" name="http://com" value="StockQuote"/>
 </wsdescBindings>
</com.ibm.etools.webservice.wsbnd:WSBinding>
```

FRAMEWORK FOR DEVELOPMENT AND CUSTOMIZATION OF WEB SERVICES DEPLOYMENT DESCRIPTORS

BACKGROUND OF THE INVENTION

The present invention relates to an improved data processing system and, in particular, to customization of Web services.

HyperText Markup Language is a document format used on the World Wide Web. Web pages are text documents built with HTML tags embedded in the text. HTML defines the page layout, fonts, and graphic elements as well as hypertext links to other documents on the Web. HTML is derived from the Standard Generalized Markup Language (SGML).

A subset of SGML is known as eXtensible Markup Language (XML). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records.

XML tags are defined in an XML Schema, which defines content type as well as name. XML tags can also be described in a Document Type Definition (DTD) format, since XML is a subset of the SGML language. HTML uses a rather loose coding style and is tolerant of coding errors while XML pages need to comply with rigid rules.

HTML and XML documents are primarily text documents. Therefore, HTML and XML documents can be created and edited using a simple text editor. In addition, specific editors may be used for creating and editing HTML and XML documents. These editors may be implemented in a variety of ways. For example, a stand-alone application may be provided. Web-based solutions may also be used. Such solutions do not require the author to install heavy software on the client and, theoretically, the editor may be supported by any computer with a Web browser application. Another way of making XML more readable is through commercially available tools based on eXstensible Stylesheet Language (XSL) technology. XSL provides a mechanism for customizing the display of the Web service configuration so that it is easier to read and interpret.

BRIEF SUMMARY OF THE INVENTION

According to one aspect of the present invention, a method for managing Web services deployment descriptors comprises parsing a deployment descriptor document to identify at least one data fragment, providing a user interface component, and providing an adapter. The adapter may be associated with the user interface component and the data fragment.

According to another aspect of the present invention, a computer program product for managing Web services deployment descriptors comprises a computer readable medium having computer readable program code embodied therein. The computer readable program code comprises computer readable program code configured to parse a deployment descriptor documents to identify at least one data fragment, computer readable program code configured to provide a user interface component, and computer readable program code configured to provide an adapter, wherein the adapter is associated with the user interface component and the data fragment.

According to yet another aspect of the present invention, an apparatus for managing Web services deployment descriptors comprises a parser, a plurality of user interface components and a plurality of adapters. The parser may divide at least one deployment descriptor document into a plurality of data fragments. Each of the plurality of adapters is associated with a respective one of the plurality of user interface components and a corresponding one of the plurality of data fragments.

According to a further aspect of the present invention, computer software is embodied in a propagated signal for managing Web services deployment descriptors. The computer software comprises computer readable program code configured to parse a deployment descriptor document to identify at least one data fragment, computer readable program code configured to provide a user interface component; and computer readable program code configured to provide an adapter, wherein the adapter is associated with the user interface component and the at least one data fragment.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 1 depicts a pictorial representation of a network of data processing systems in which the present invention may be implemented;

FIG. 2 is a block diagram of a data processing system that may be implemented as a server in accordance with one aspect of the present invention;

FIGS. 7A-7D illustrate example XML deployment descriptors and corresponding user interface components for a web services descriptor document in accordance with an aspect of the present invention;

FIGS. 8A and 8B illustrate example XML deployment descriptors and corresponding user interface components for Web service security extensions deployment descriptors in accordance with an aspect of the present invention;

FIGS. 9A-9D illustrate example XML deployment descriptors and corresponding user interface components for Web service bindings deployment descriptors in accordance with an aspect of the present invention;

DETAILED DESCRIPTION OF THE INVENTION

Figure 3:
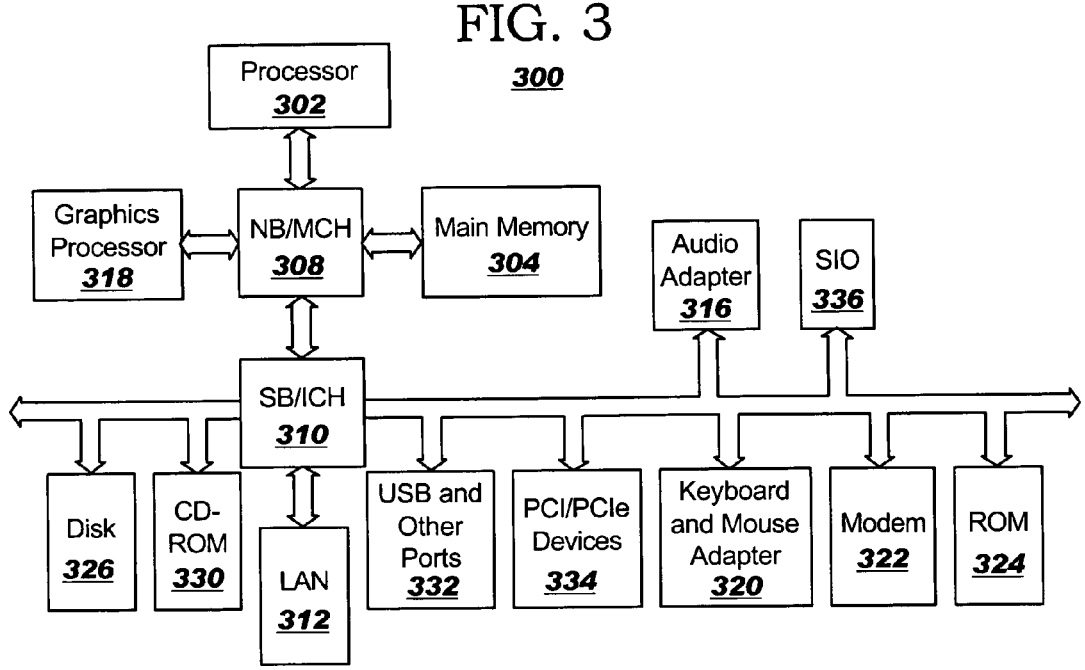
FIG. 3 is a block diagram of a data processing system in which the present invention may be implemented.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention provides a method, apparatus, and computer program product for development and customization of XML based Web services deployment descriptors. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with an aspect of the present invention, server 104 provides an editor to clients 108, 110, 112. More particularly, server 102 may provide access to XML based Web services descriptor files in storage 106, for example. Thus, a user may access the XML based descriptor files directly using a simple and well-known text editor.

In accordance with one aspect of the present invention, a dynamic framework is provided for developing a graphical user interface (GUI) for reading and editing Web services deployment descriptors. This framework involves the development of user interface (UI) components for XML data fragments in the deployment descriptors and adapters responsible for synchronizing between these UI components and XML data fragments. This framework may be provided through an editor mechanism on server 104 in the depicted example. The UI components may be accessed, for example, using a browser client application on one of clients 108, 110, 112. Alternatively, the deployment descriptor documents may be accessed directly using a text editor, for instance, on one of clients 108, 110, 112.

A two-way synchronization is also achieved using the adapters. Updates in an UI component will result in a corresponding change in the deployment descriptors. Similarly, changes that are made directly to the deployment descriptor documents may be reflected in the UI components. Thus, the editor mechanism of the present invention allows both reading and editing of XML documents. The editor mechanism of the present invention also allows disjoint deployment descriptors to be presented together as one logical unit. The editor mechanism of the present invention also allows continual synchronization between UI components and XML documents.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an asspect of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Microsoft® Windows® XP, which is available from Microsoft Corporation. Microsoft and Windows are registered trademarks of Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4A:
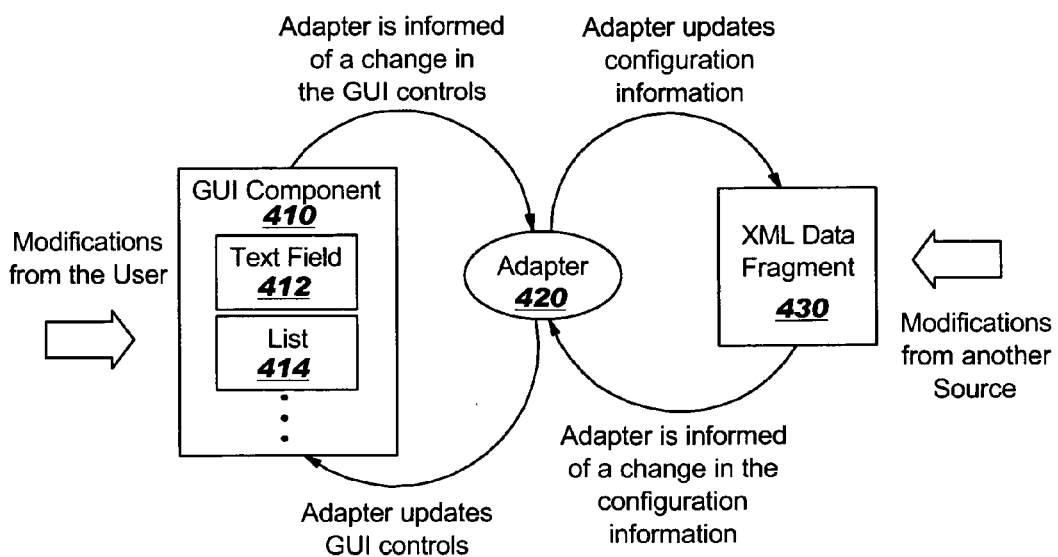
FIGS. 4A and 4B depict a framework for developing and customizing Web services deployment descriptors in accordance with an aspect of the present invention.
Figure 4B:
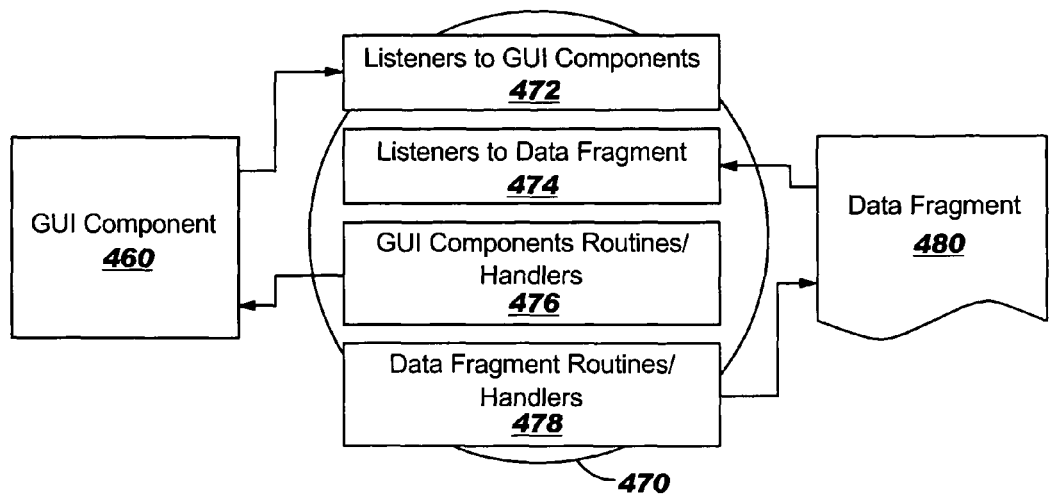

FIGS. 4A and 4B depict a framework for developing and customizing Web services deployment descriptors in accordance with an aspect of the present invention. More particularly, with reference to FIG. 4A, GUI component 410 is generated based on XML data fragment 430. A GUI component may include one or more GUI controls for displaying data and capturing user input. In the depicted example, GUI component 410 includes text field control 412, list control 414, and other controls (not shown).

XML data fragment 430 may be a portion of an XML file, a portion of another XML data fragment, or a collection of XML data fragments, for example. There may be one adapter and one GUI component for each identified data fragment. Adapter 420 keeps track of the mapping and synchronization between the GUI component 410 and XML data fragment 430. When a user makes a modification in GUI component 410, adapter 420 is informed of this modification and updates XML data fragment 430 accordingly. Similarly, if any changes occur in XML data fragment 430 from another source, adapter 420 is informed of the changes and updates GUI component 410 accordingly. Another source may originate from the same or a different computer. As an example, a user may develop XML based Web services deployment descriptors using the GUI components and, in another window, edit the XML descriptors using a simple text editor. Alternately, one user may develop or customize the Web Services deployment descriptors on one computer while another user directly accesses the XML file(s) on another computer.

In addition to displaying the Web services configuration in a way that hides the underlying XML, this framework also displays the data in a way that hides file boundaries from the user. Multiple files may be registered, by name, with one editor and, as long as the mapping between the GUI components and the XML data fragments contained in the files is complete, the contents of the registered files are made available in the editor.

FIG. 4B illustrates an adapter for synchronizing Web services deployment descriptors with GUI components in accordance with a preferred embodiment of the present invention. Adapter 470 includes listeners to GUI components 472, listeners to the data fragment 474, GUI component routines/handlers 476, and data fragment routines/handlers 478. Adapter 470 contains a reference to GUI component 460 and data fragment 480.

When listeners 472 are notified that changes are made through GUI component 460, data fragments routines/handlers 478 are invoked. Data fragments routines/handlers propagate these changes to data fragment 480. Similarly, when listeners 474 are notified that changes are made to data fragment 480, GUI components routines/handlers 476 are invoked. GUI components routines/handlers 476 propagate these changes to GUI component 460.

Figure 5:
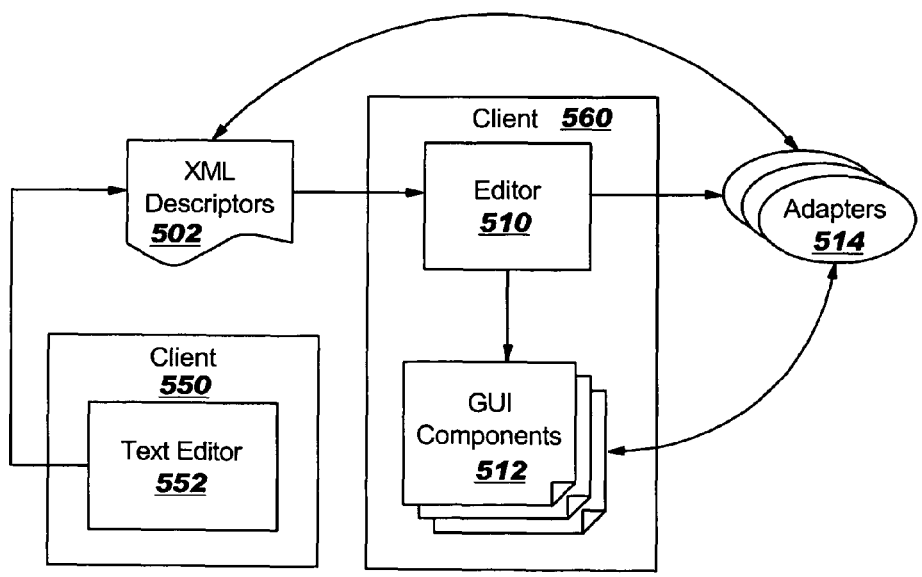
FIG. 5 is a block diagram depicting initialization and operation of an editor for development and customization of XML based Web services deployment descriptors in accordance with an aspect of the present invention.

FIG. 5 is a block diagram depicting initialization and operation of an editor for development and customization of XML based Web services deployment descriptors in accordance with a preferred embodiment of the present invention. Editor 510, in client 560 opens XML descriptors 502. Editor 510 parses XML descriptors 502 to identify or divides the XML descriptors into data fragments. As described above, an XML data fragment is a portion of an XML deployment descriptor file or files. A data fragment may be a portion of another data fragment or, conversely, a data fragment may be a collection of other data fragments. Many techniques may be used for parsing the XML descriptors; however, the manner in which XML deployment descriptors are divided into data fragments is not the focus of the present invention.

There is an adapter type for every GUI component and editor 510 creates an adapter instance for each instance of GUI components 512. Each instance of adapters 514 registers an association between one of GUI components 512 and a data fragment in XML descriptors 502.

In operation, GUI components 512 are provided to client 560. GUI components 512 may be presented to a user at client 560. GUI components 512 may be, for example, Java™ Standard Widget Toolkit (SWT) classes that include controls, such as text fields, drop-down boxes, lists, radio buttons, tables, buttons, and the like. These controls may be used to develop and customize the Web services without being exposed to the potentially complicated XML deployment descriptors. Thus, users need not know the language and syntax of the XML descriptors, just the details of the Web services they wish to deploy or configure. The user may then use editor 510, in which the GUI components are rendered, to navigate GUI components 512 and send changes to adapters 514. In turn, adapters 514 listen for these changes and effectuate appropriate changes to XML descriptors 502.

Adapters 514 also listen for changes to data fragments within XML descriptors 502. A user at client 550 may directly access XML descriptors 502 using, for example text editor 552. Responsive to changes being made directly to XML descriptors 502, adapters 514 propagate these changes to GUI components 512.

Figure 6:
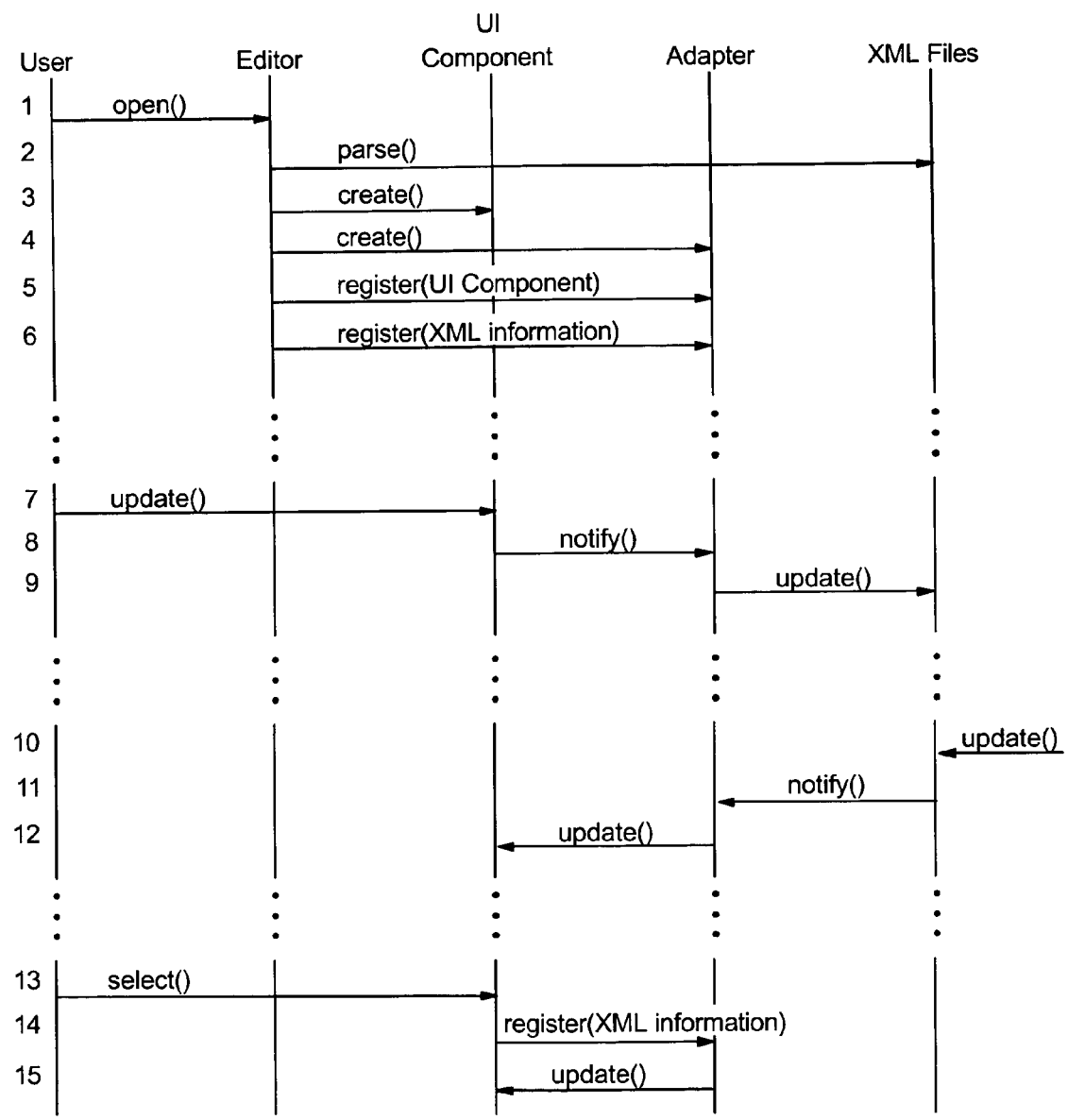
FIG. 6 is a timing diagram illustrating the operation of the framework for development and customization of XML based Web services deployment descriptors in accordance with a preferred embodiment of the present invention.

FIG. 6 is a timing diagram illustrating the operation of the framework for development and customization of XML based Web services deployment descriptors in accordance with an aspect of the present invention. The framework operates as follows:

1. A user initiates reading or editing of the Web services deployment descriptors by opening an editor. The editor serves as the GUI for the deployment descriptors.
2. The editor parses the deployment descriptors and identifies the XML data fragments.
3. As part of the editor's initialization, the editor creates all the UI components for each of the identified XML data fragments.
4. The editor creates the adapters.
5. The editor registers the UI components with the adapters.
6. The editor registers the corresponding data fragments with the adapters. The registration process adds listeners to both UI components and XML data fragments.
7. The user initiates an update to the deployment descriptors via the GUI.
8. The update triggers the listeners to notify the adapter.
9. When the adapter receives this notification, it invokes the routines/handlers that are responsible for updating the corresponding XML data fragments. The XML data fragments may reside in disjoint documents.
10. Similarly, any updates in the deployment descriptors trigger the listeners of the affected XML data fragments.
11. The updates trigger the listeners to notify the adapter.
12. The adapter invokes the routines/handlers that are responsible for updating the corresponding UI components. The user then sees the most up-to-date data in the deployment descriptors and a two-way synchronization is achieved.
13. Registration for XML data fragments with adapters is not restricted to being performed only in the initialization process. At any point in time, registration for XML data fragments may occur. An example of this scenario is when a user selects an item from a list to be added, which may result in new XML information.

14. The GUI component then registers the XML information with the adapter.
15. The adapter, in turn, updates the GUI component.

As seen above, the framework achieves a two-way synchronization between GUI components and the corresponding XML deployment descriptors. The framework is dynamic, allowing changes to GUI components and data fragments to be propagated throughout the framework. Thus, a user may develop or customize Web services without being directly exposed to the XML deployment descriptors, while still interacting with an up-to-date user interface.

FIGS. 7A-7D illustrate example XML deployment descriptors and corresponding user interface components for a web services descriptor document in accordance with an aspect of the present invention. XML descriptor file 700 is parsed to identify XML data fragments. The GUI components shown in FIGS. 7B-7D correspond to the data fragments identified in XML descriptor file 700.

Figure 7B:
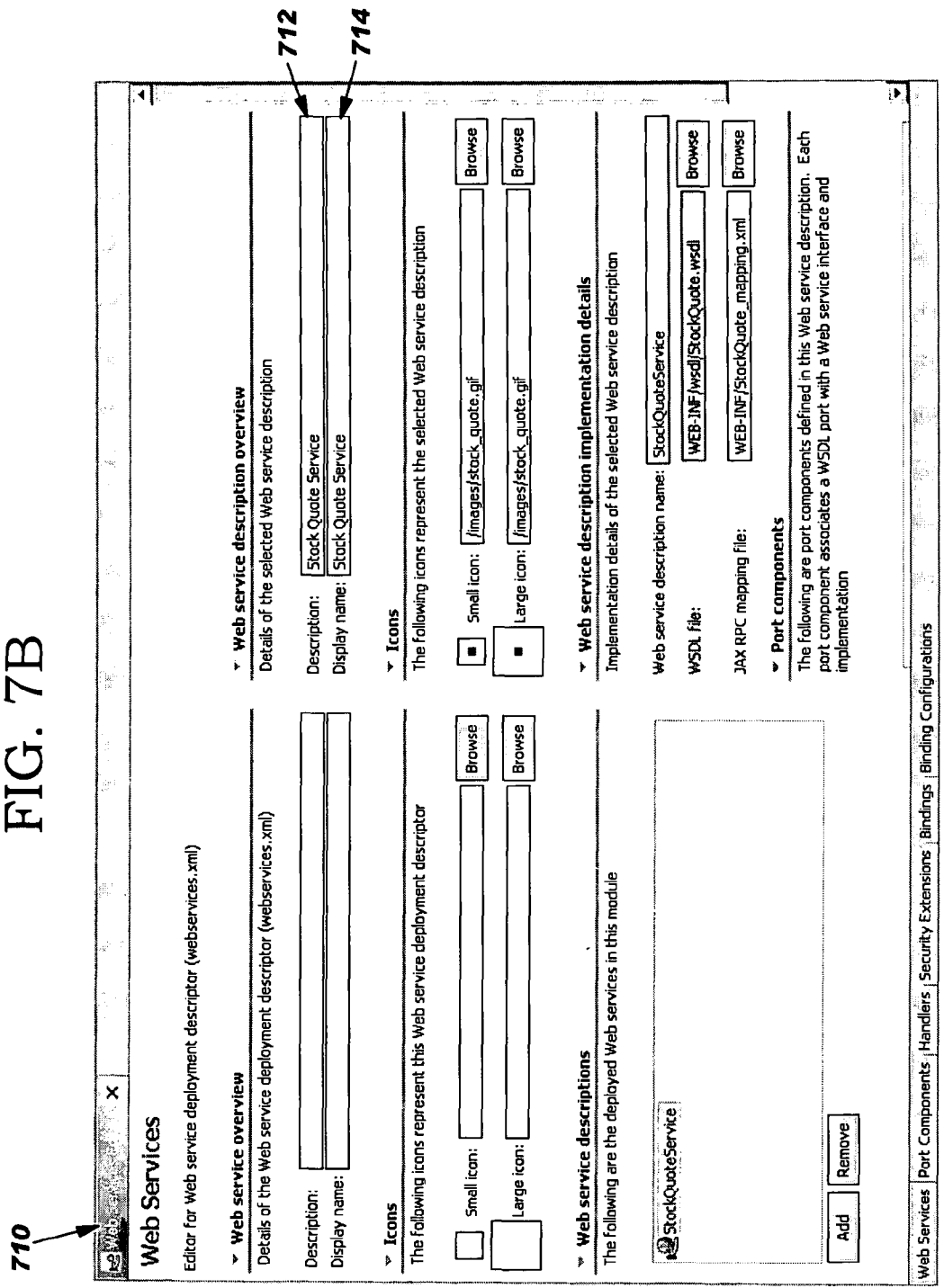
Figure 7C:
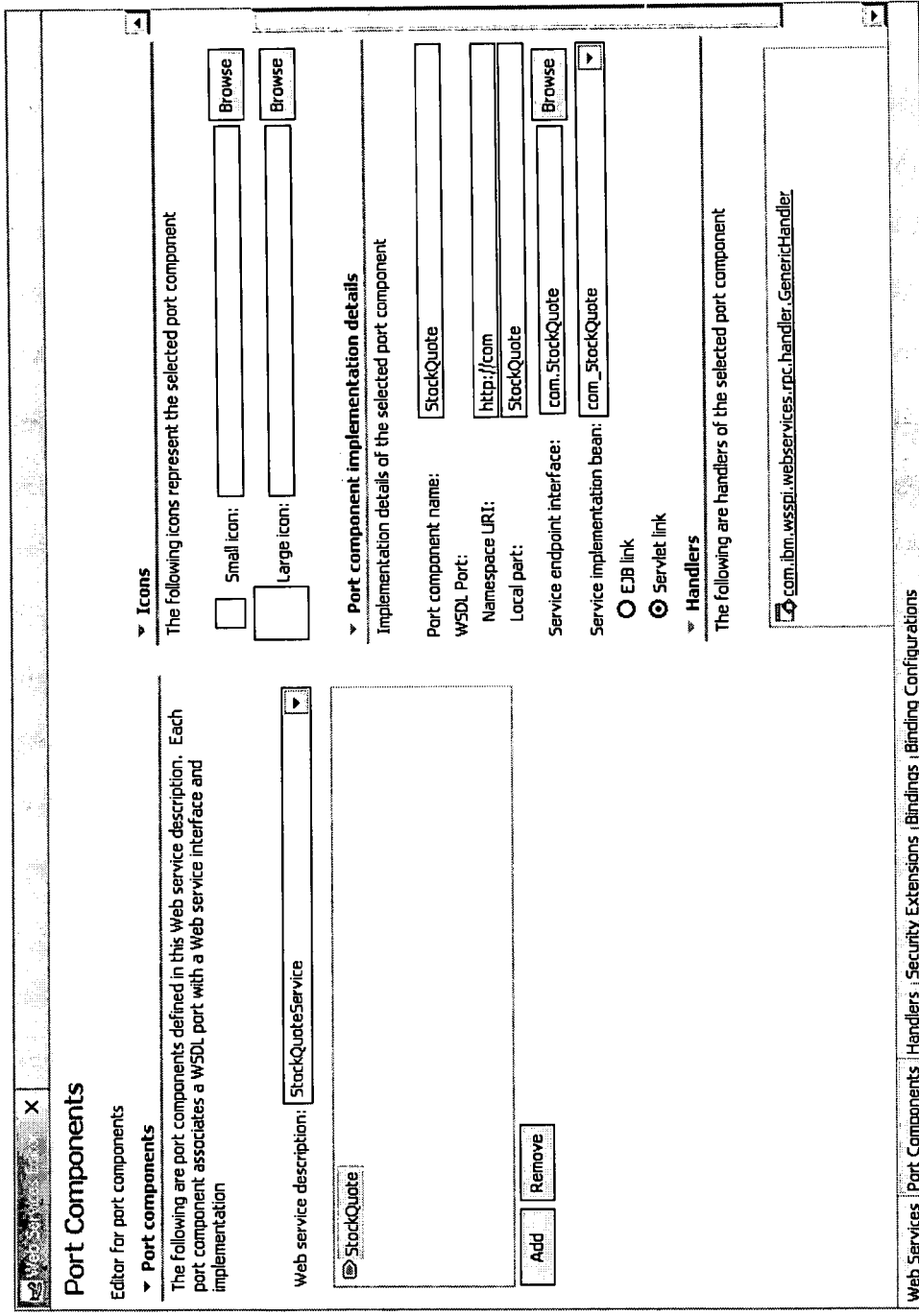
Figure 7D:
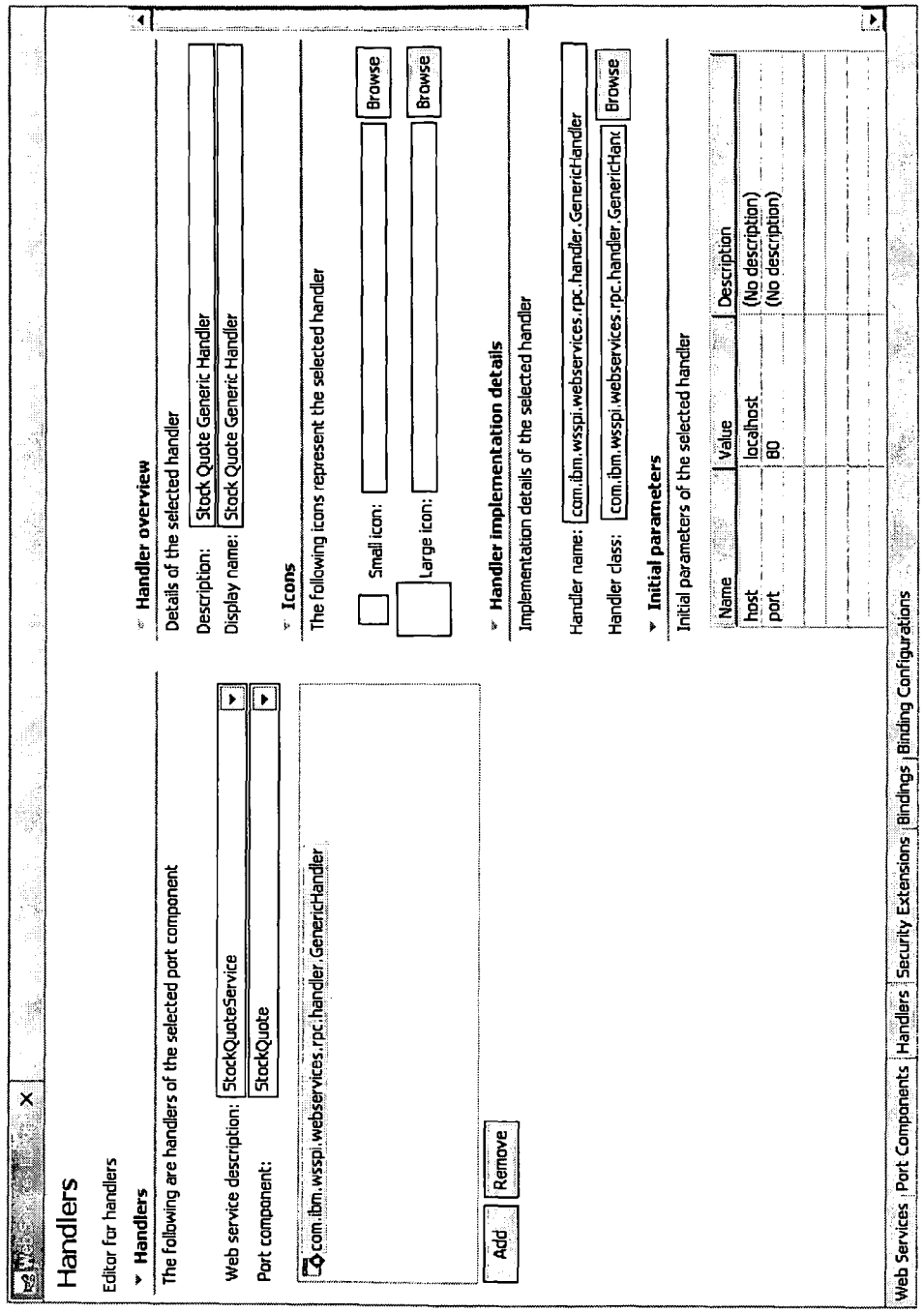

More particularly, as shown in FIG. 7B, GUI window 710 includes controls for the Web services. For example, text fields 712, 714 correspond to the description and display-name tags in XML descriptor file 700. FIGS. 7C and 7D show GUI components that correspond to other XML information in XML descriptor file 700.

Figure 8B:
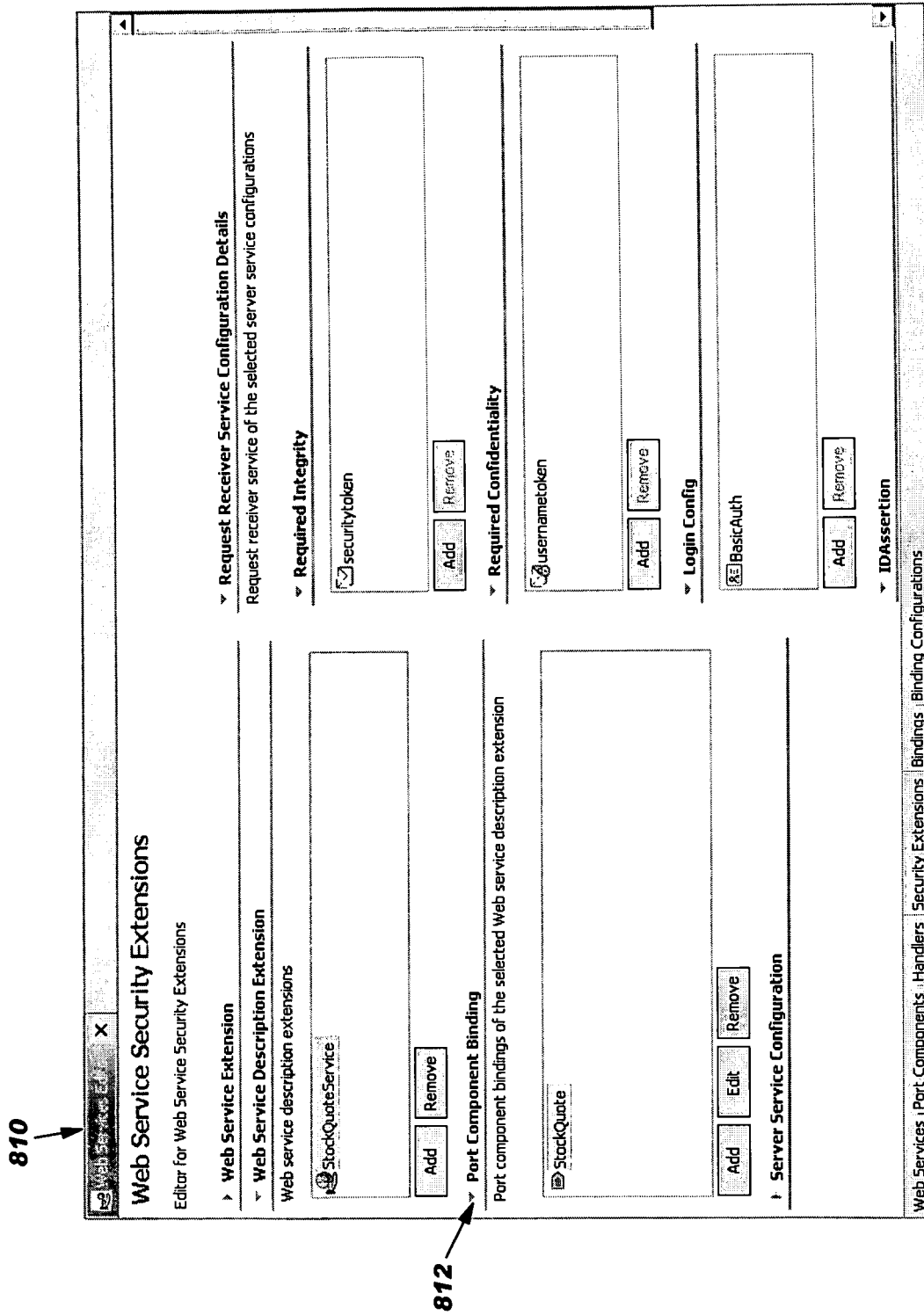

FIGS. 8A and 8B illustrate example XML deployment descriptors and corresponding user interface components for Web service security extensions deployment descriptors in accordance with an aspect of the present invention. XML descriptor file 800 is parsed to identify XML data fragments. The GUI components shown in FIG. 8B correspond to the data fragments identified in XML descriptor file 800. More particularly, as shown in FIG. 8B, GUI window 810 includes controls for the Web service security extensions. For example, UI components 812 correspond to the port component binding data fragment in XML descriptor file 800.

Figure 9C:
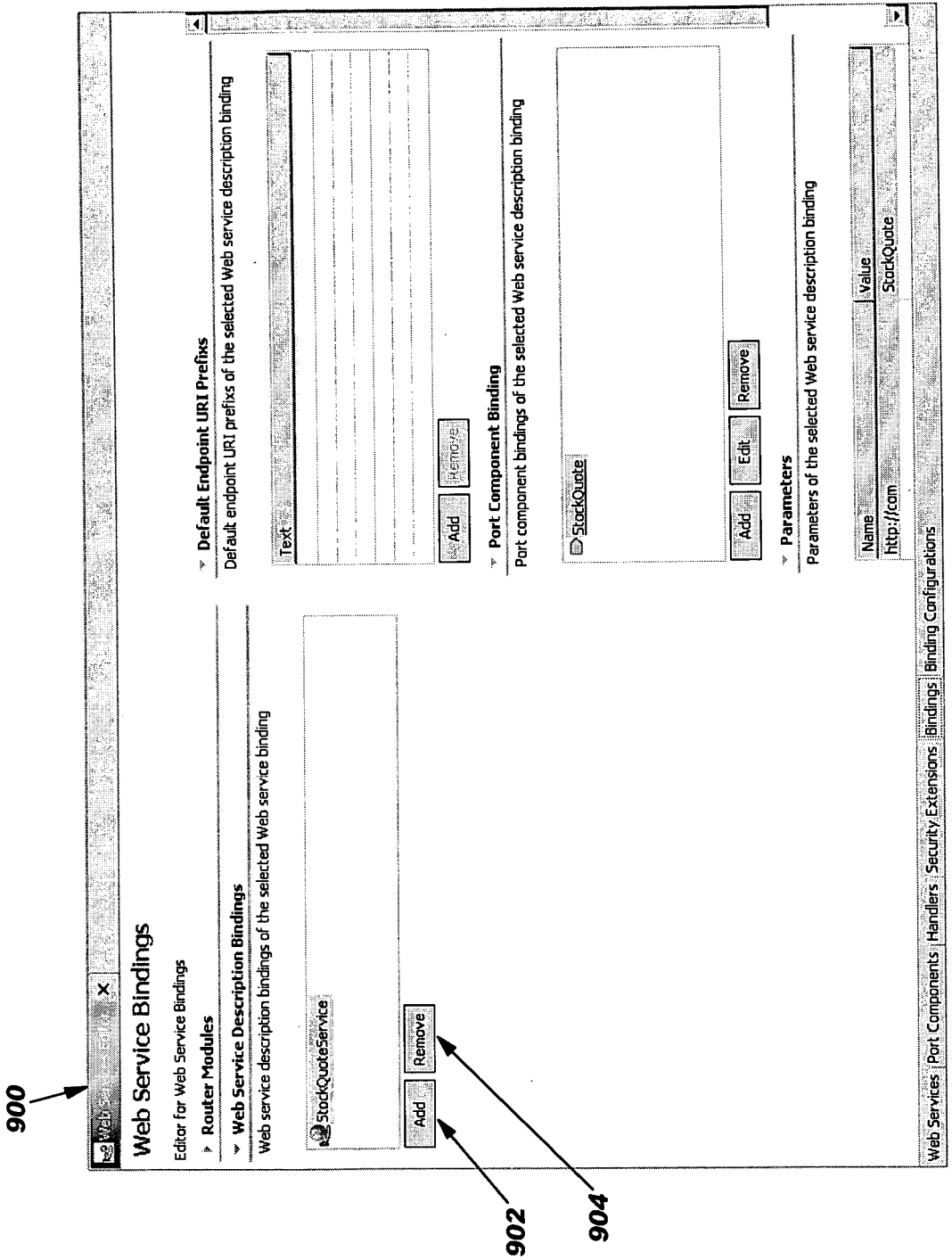

FIGS. 9A-9D illustrate example XML deployment descriptors and corresponding user interface components for Web service bindings deployment descriptors in accordance with an aspect of the present invention. XML descriptor file shown in FIGS. 9A and 9B is parsed to identify XML data fragments. The GUI components shown in FIGS. 9C and 9D correspond to the data fragments identified in the XML descriptor file.

Figure 9D:
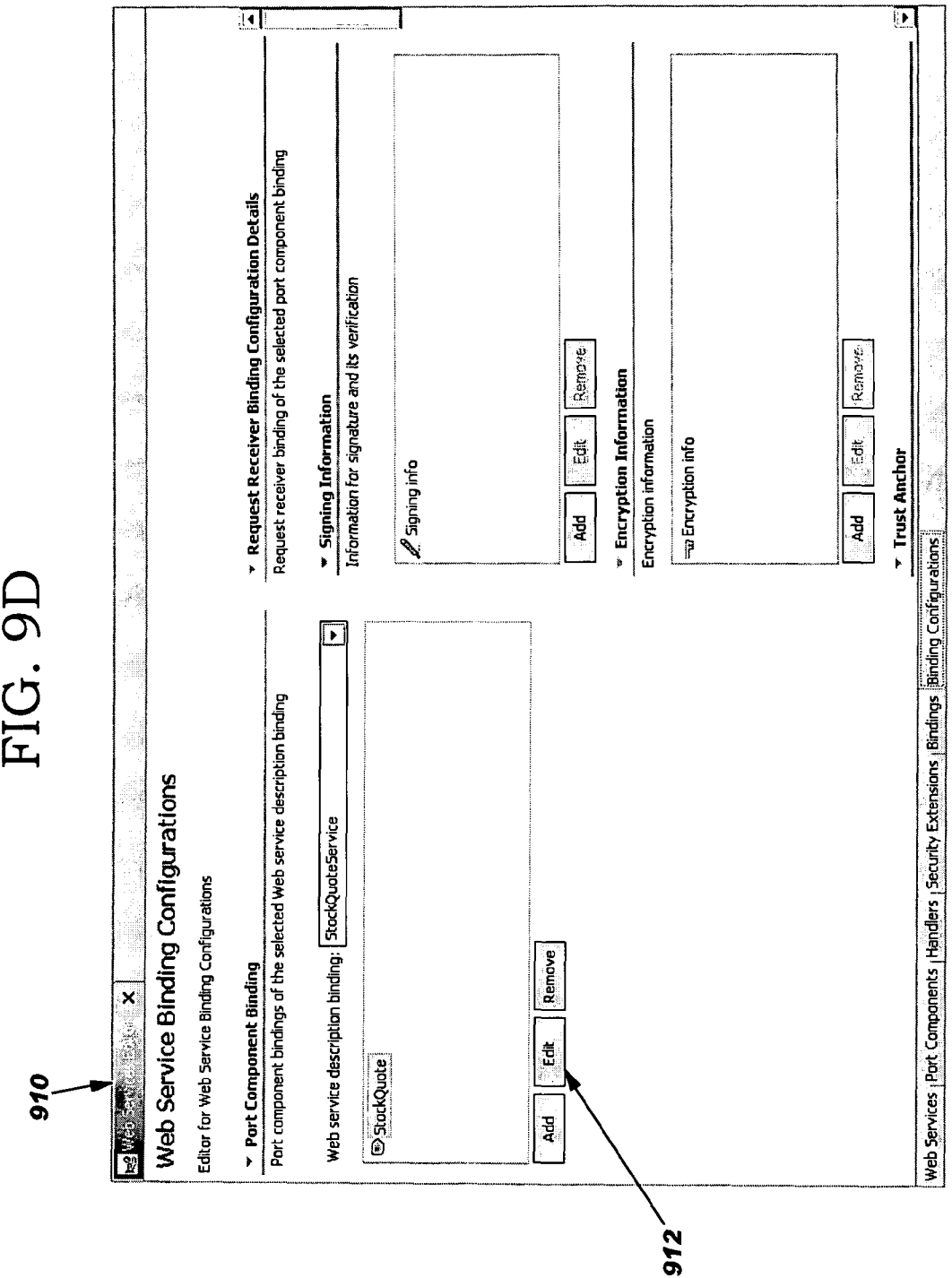

More particularly, as shown in FIG. 9C, GUI window 900 includes button control 902 for adding descriptor information and button control 904 for removing descriptor information. As shown in FIG. 9D, GUI window 910 includes button control 912 for editing descriptor information. Selection of buttons 902 and 912 may result in further GUI components being created or presented for the development or customization of XML deployment descriptors. It follows that interaction with these GUI components may result in further data fragments being created. Selection of 904 may result in GUI and corresponding data fragments being removed.

Figure 10:
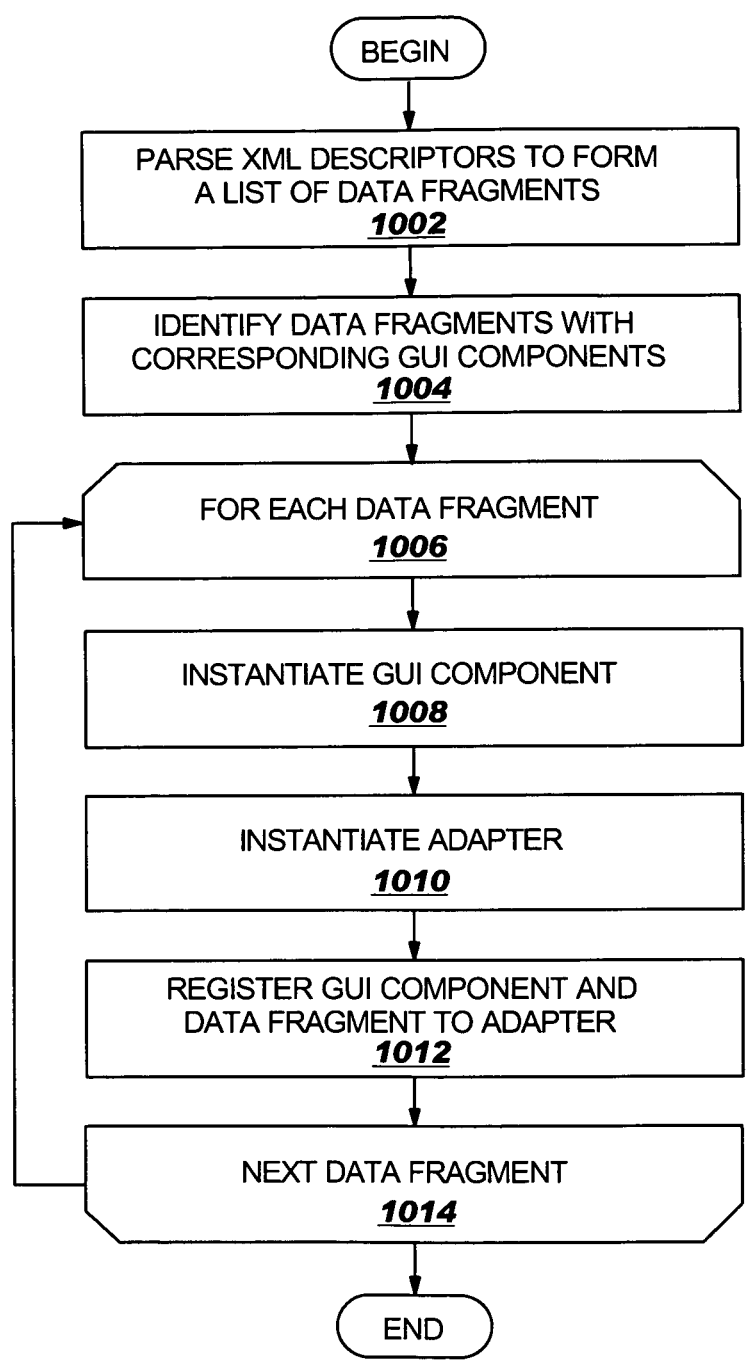
FIG. 10 is a flowchart illustrating the operation of initializing an editor framework for development and customization of Web services deployment descriptors in accordance with an aspect of the present invention.

FIG. 10 is a flowchart illustrating the operation of initializing an editor framework for development and customization of Web services deployment descriptors in accordance with an aspect of the present invention. Operation begins and the editor parses the XML descriptors to form a list of data fragments (block 1002). The editor then identifies data fragments and corresponding GUI components (block 1004).

For each data fragment in the list (block 1006), the editor instantiates the appropriate GUI component (block 1008), instantiates an adapter (block 1010), and registers the GUI component and corresponding data fragment to the adapter (block 1012). If the current data fragment is not the last data fragment in the list in block 1014, the loop returns to block 1006 to initialize the editor framework for the next data fragment. However, if the current data fragment is the last data fragment in block 1014, operation ends.

Figure 11:
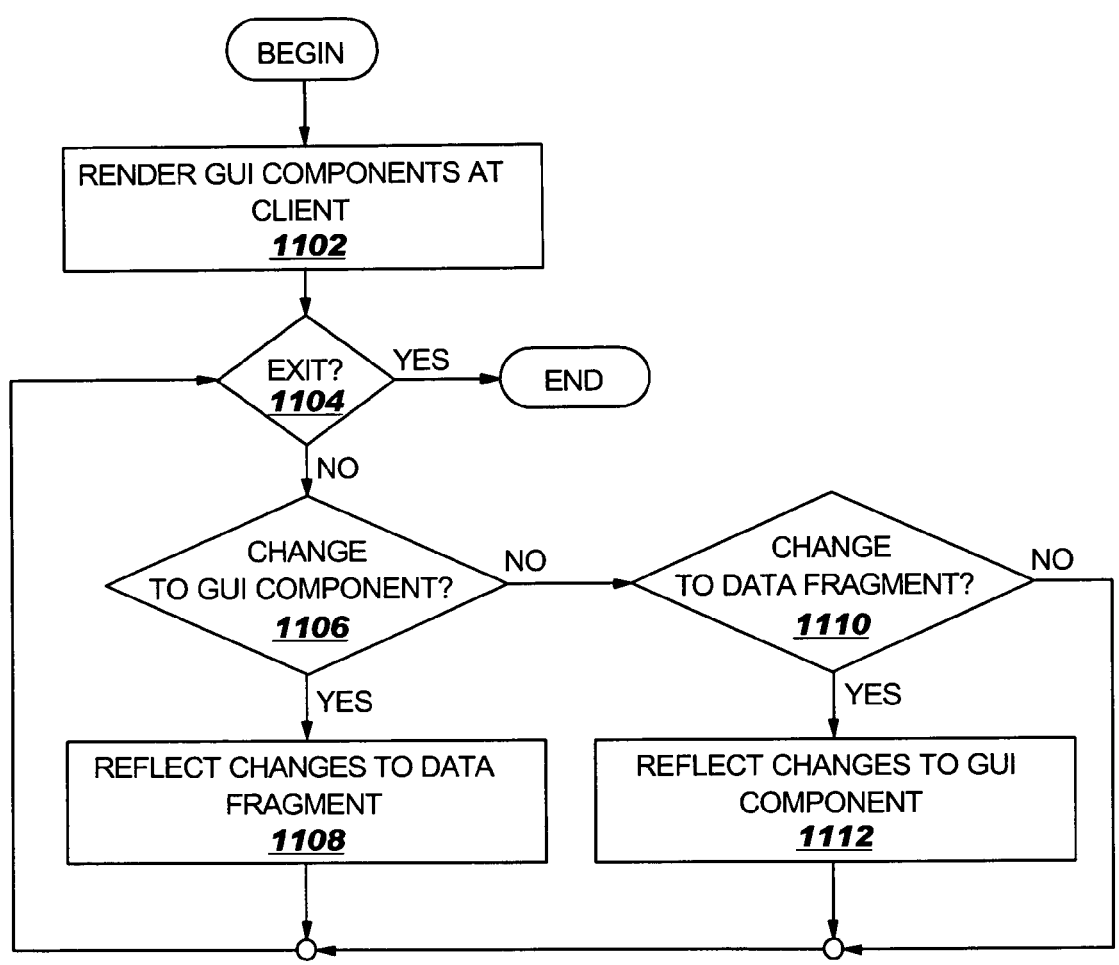
FIG. 11 is a flowchart illustrating the operation of an editor framework for development and customization of Web services deployment descriptors in accordance with an aspect embodiment of the present invention.

FIG. 11 is a flowchart illustrating the operation of an editor framework for development and customization of Web services deployment descriptors in accordance with an aspect of the present invention. Operation begins when an editor is activated by a requesting client, such as a Java™ SWT editor. The editor renders the GUI components to the requesting client (block 1102). A determination is made as to whether an exit condition exists (block 1104). An exit condition may exist, for example, when the requesting client closes the editor or when the server providing access to the editor application shuts down. If an exit condition exists, operation ends.

If an exit condition does not exist in block 1104, a determination is made as to whether there is a change to a GUI component (block 1106). If an adapter is notified of a change to a GUI component, the editor reflects the changes to the appropriate data fragment (block 1108). Thereafter, operation returns to block 1106 to determine whether an exit condition exists.

If an adapter does not receive notification of a change to GUI component in block 1106, a determination is made as to whether there is a change to a data fragment (block 1110). If an adapter is notified of a change to a data fragment, the editor reflects the changes to the appropriate GUI component (block 1112). Thereafter, operation returns to block 1104 to determine whether an exit condition exists. If an adapter is not notified of a change to a data fragment in block 1110, operation returns to block 1104 to determine whether an exit condition exists.

The flowchart and block diagrams of FIGS. 1-5 and 10-11 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing hardware system, for managing Web services deployment descriptors, the method comprising:
   parsing, with a parser, a deployment descriptor document to identify at least one data fragment;
   providing a user interface component;
   providing an adapter, wherein the adapter is associated with the user interface component and the data fragment;
   updating the data fragment in response to the adapter being notified of a change to the associated user interface component; and
   updating the associated user interface component in response to the adapter being notified of a change to the associated data fragment.

2. The method of claim 1, wherein the data fragment is one of a portion of a deployment descriptor document, a portion of another data fragment, and a collection of other data fragments.

3. The method of claim 1, wherein the user interface component presents one unified display of all information across multiple deployment descriptor files.

4. The method of claim 1, wherein the deployment descriptor document comprises at least one extensible markup language file.

5. The method of claim 1, wherein parsing a deployment descriptor document to identify at least one data fragment comprises parsing a plurality of deployment documents to identify a plurality of data fragments, and wherein providing a user interface component comprises providing a plurality of user interface components, and wherein providing an adapter comprises providing a plurality of adapters, and wherein each of the plurality of adapters is associated with appropriate ones of the plurality of user interface components and a corresponding one of the plurality of data fragments.

6. The method of claim 5, further comprising:
   updating the associated one data fragment in response to the corresponding adapter being notified of a change to the associated user interface component.

7. The method of claim 5, further comprising:
   updating the associated user interface component in response to the corresponding adapter being notified of a change to the associated data fragment.

8. A computer program product for managing Web services deployment descriptors, the computer program product comprising:
   a computer readable storage medium having computer readable program code embodied therein, the computer readable program code comprising:
   computer readable program code configured to parse a deployment descriptor documents to identify at least one data fragment;
   computer readable program code configured to provide a user interface component;
   computer readable program code configured to provide an adapter, wherein the adapter is associated with the user interface component and the data fragment;
   computer readable program code configured to update the data fragment in response to the adapter being notified of a change to the associated user interface component; and
   computer readable program code configured to update the associated user interface component in response to the adapter being notified of a change to the associated data fragment.

9. The computer program product of claim 8, wherein the data fragment is one of a portion of a deployment descriptor document, a portion of another data fragment, and a collection of other data fragments.

10. The computer program product of claim 8, wherein the user interface component presents one unified display of all information across multiple deployment descriptor files.

11. The computer program product of claim 8, wherein the deployment descriptor document comprises at least one extensible markup language file.

12. The computer program product of claim 8, wherein the computer readable program code configured to parse a deployment descriptor documents to identify at least one data fragment comprises computer readable program code configured to parse a plurality of deployment documents to identify a plurality of data fragments, and wherein the computer readable program code configured to provide a user interface component comprises computer readable program code configured to provide a plurality of user interface components, and wherein the computer readable program code configured to provide an adapter comprises computer readable program code configured to provide a plurality of adapters, and wherein each of the plurality of adapters is associated with appropriate ones of the plurality of user interface components and a corresponding one of the plurality of data fragments.

13. The computer program product of claim 12, further comprising computer readable program code configured to update the associated one data fragment in response to the corresponding adapter being notified of a change to the associated user interface component.

14. The computer program product of claim 12, further comprising computer readable program code configured to update the associated user interface component in response to the corresponding adapter being notified of a change to the associated data fragment.

15. An apparatus for managing Web services deployment descriptors, the apparatus comprising:
   a processor and a memory;
   a parser, wherein the parser divides at least one deployment descriptor document into a plurality of data fragments;
   a plurality of user interface components; and
   a plurality of adapters, wherein each of the plurality of adapters is associated with a respective one of the plurality of user interface components and a corresponding one of the plurality of data fragments, wherein each of the plurality of adapters comprises:
   a user interface component listener;
   a data fragment listener;
   a user interface handler that effectuates changes to a user interface component responsive to the data fragment listener receiving notification of a change to an associated data fragment; and
   a data fragment handler that effectuates changes to a data fragment responsive to the user interface listener receiving notification of a change to an associated user interface component.

16. The apparatus of claim 15, wherein each of the plurality data fragments is one of a portion of a deployment descriptor document, a portion of another data fragment, and a collection of other data fragments.

17. The apparatus of claim 15, wherein the plurality of user interface components present one unified display of all information across multiple deployment descriptor files.

18. The apparatus of claim 15, wherein the at least one deployment descriptor document comprises at least one extensible markup language file.

19. The apparatus of claim 15, wherein the parser divides a plurality of deployment descriptor documents into a plurality of data fragments.

\* \* \* \* \*